(12) United States Patent
Fahland et al.

(10) Patent No.: US 10,392,055 B2
(45) Date of Patent: Aug. 27, 2019

(54) TURBULENT AIR MITIGATION FOR VEHICLES

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US); David Dominguez, Tucson, AZ (US); Samantha J. Bray, South Bend, NE (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 15/215,484

(22) Filed: Jul. 20, 2016

(65) Prior Publication Data
US 2018/0022404 A1  Jan. 25, 2018

(51) Int. Cl.
| | | |
|---|---|---|
| *B62D 37/02* | (2006.01) | |
| *B60W 40/02* | (2006.01) | |
| *B62D 35/00* | (2006.01) | |
| *B62D 35/02* | (2006.01) | |

(52) U.S. Cl.
CPC ............. *B62D 37/02* (2013.01); *B60W 40/02* (2013.01); *B62D 35/005* (2013.01); *B62D 35/02* (2013.01); *B60W 2300/18* (2013.01); *B60W 2300/28* (2013.01); *B60W 2550/30* (2013.01); *B60Y 2200/114* (2013.01); *B60Y 2300/02* (2013.01); *Y02T 10/82* (2013.01); *Y02T 10/88* (2013.01)

(58) Field of Classification Search
None
See application file for complete search history.

(56) References Cited

U.S. PATENT DOCUMENTS

| | | | | |
|---|---|---|---|---|
| 4,810,022 A | * | 3/1989 | Takagi ................. | B62D 35/005 296/180.5 |
| 5,908,217 A | * | 6/1999 | Englar .................. | B62D 37/02 296/180.1 |
| 8,740,285 B2 | * | 6/2014 | Beckon ................ | B60Q 1/2661 296/180.1 |
| 8,744,666 B2 | * | 6/2014 | Switkes ................ | G08G 1/166 701/28 |
| 9,381,957 B1 | * | 7/2016 | Auden ................. | B62D 35/007 |
| 9,561,827 B2 | * | 2/2017 | Parry-Williams ...... | B62D 37/02 |
| 9,694,822 B2 | * | 7/2017 | Neaves .................. | F02D 29/02 |
| 2006/0103927 A1 | * | 5/2006 | Samukawa ............ | G01S 17/42 359/436 |
| 2008/0035789 A1 | * | 2/2008 | Lewis .................. | G08G 5/0008 244/1 R |

(Continued)

*Primary Examiner* — Jean Paul Cass
(74) *Attorney, Agent, or Firm* — Lorenz & Kopf LLP

(57) ABSTRACT

Methods, systems, and vehicles are provided for mitigating turbulent air for vehicles. In accordance with one embodiment, a vehicle includes one or more downforce elements, one or more sensors, and a processor. The one or more sensors are configured to obtain one or more parameter values for the vehicle during operation of the vehicle. The processor is processor coupled to the one or more sensors, and is configured to at least facilitate determining whether turbulent air for the vehicle is likely using the parameters, and adjusting a downforce for the vehicle, during operation of the vehicle, by providing instructions for controlling the one or more downforce elements when it is determined that turbulent air for the vehicle is likely.

12 Claims, 2 Drawing Sheets

(56) References Cited

U.S. PATENT DOCUMENTS

| | | | |
|---|---|---|---|
| 2010/0090497 A1* | 4/2010 | Beckon | B60Q 1/2661 |
| | | | 296/180.5 |
| 2012/0036016 A1* | 2/2012 | Hoffberg | G05B 15/02 |
| | | | 705/14.58 |
| 2013/0018766 A1* | 1/2013 | Christman | B60L 3/0023 |
| | | | 705/34 |
| 2014/0001789 A1* | 1/2014 | Cimatti | B62D 35/02 |
| | | | 296/180.1 |
| 2015/0232138 A1* | 8/2015 | Parry-Williams | B62D 37/02 |
| | | | 296/180.5 |
| 2016/0054735 A1* | 2/2016 | Switkes | G08G 1/22 |
| | | | 701/23 |
| 2017/0057565 A1* | 3/2017 | Sarhadiangardabad | |
| | | | B62D 35/02 |
| 2017/0088106 A1* | 3/2017 | Fahland | B60T 8/1766 |
| 2017/0088192 A1* | 3/2017 | Auden | B62D 35/00 |
| 2017/0088193 A1* | 3/2017 | Heil | B62D 35/00 |
| 2017/0088201 A1* | 3/2017 | Heil | B62D 35/007 |
| 2017/0092022 A1* | 3/2017 | Heil | B62D 35/005 |
| 2017/0158257 A1* | 6/2017 | Fahland | B62D 35/005 |
| 2017/0240224 A1* | 8/2017 | Gaylard | B62D 35/005 |
| 2018/0009450 A1* | 1/2018 | Shaw | B61C 15/04 |
| 2018/0022343 A1* | 1/2018 | Fahland | B60W 10/04 |
| | | | 701/48 |
| 2018/0022403 A1* | 1/2018 | Fahland | B60W 40/12 |
| | | | 701/49 |
| 2018/0079405 A1* | 3/2018 | Gaither | F02D 41/0047 |

* cited by examiner

TURBULENT AIR MITIGATION FOR VEHICLES

TECHNICAL FIELD

The present disclosure generally relates to vehicles, and more particularly relates to methods and systems for mitigating turbulent air for vehicles.

BACKGROUND

Certain vehicles today, such as racecars and other performance vehicles, utilize downforce for potentially improving performance. For example, certain performance vehicles utilize airfoils, wings, or other devices to generate downforce for the vehicle. An increase in downforce can enhance lateral capability for the vehicle, for example when turning a corner. However, in certain environments turbulent air can result in an undesired imbalance of the downforce under certain circumstances.

Accordingly, it is desirable to provide techniques for improved mitigation of turbulent air for vehicles. It is also desirable to provide methods, systems, and vehicles incorporating such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises obtaining one or more parameter values for a vehicle during operation of the vehicle, determining whether turbulent air for the vehicle is likely using the parameters, and adjusting a downforce for the vehicle, via a processor, using instructions provided via the processor for controlling one or more downforce elements for the vehicle when it is determined that turbulent air for the vehicle is likely.

In accordance with another exemplary embodiment, a system is provided. The system comprises one or more sensors and a processor. The one or more sensors are configured to obtain one or more parameter values for a vehicle during operation of the vehicle. The processor is coupled to the one or more sensors, and is configured to at least facilitate determining whether turbulent air for the vehicle is likely using the parameters, and adjusting a downforce for the vehicle, by providing instructions for controlling one or more downforce elements for the vehicle for the vehicle, when it is determined that turbulent air for the vehicle is likely.

In accordance with a further exemplary embodiment, a vehicle is provided. The vehicle comprises one or more downforce elements, one or more sensors, and a processor. The one or more sensors are configured to obtain one or more parameter values for a vehicle during operation of the vehicle. The processor is processor coupled to the one or more sensors, and is configured to at least facilitate determining whether turbulent air for the vehicle is likely using the parameters, and adjusting a downforce for the vehicle, during operation of the vehicle, by providing instructions for controlling the one or more downforce elements when it is determined that turbulent air for the vehicle is likely.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
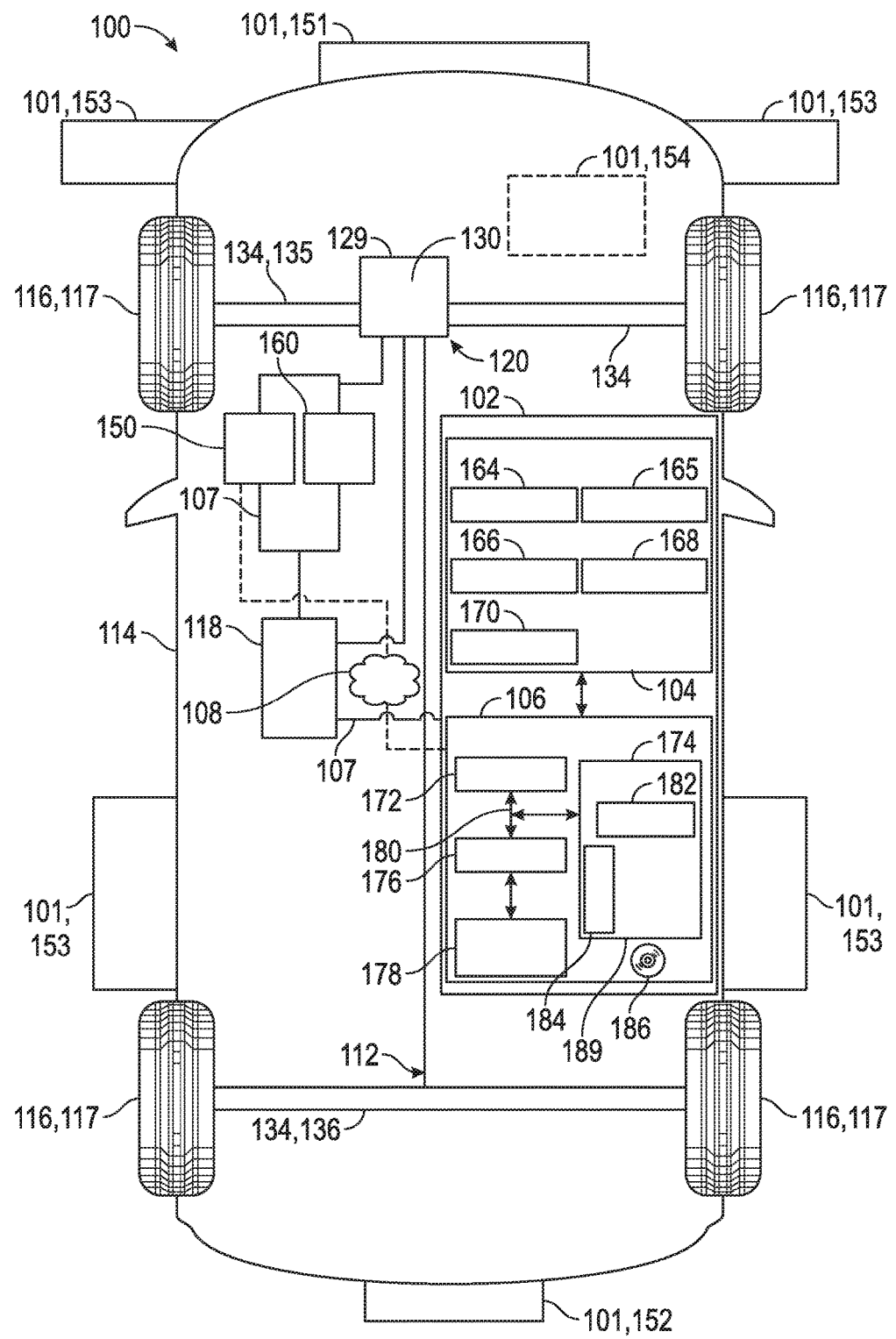
FIG. 1 is a functional block diagram of a vehicle, and that includes a control system for mitigating turbulent air for the vehicle, in accordance with an exemplary embodiment.

FIG. 1 illustrates a vehicle 100, according to an exemplary embodiment. As described in greater detail below, the vehicle 100 includes a body 114 and a control system 102 for mitigating turbulent air for the vehicle 100. In various embodiments the vehicle 100 comprises an automobile; however, this may vary in other embodiments. Also in certain embodiments the vehicle 100 comprises a performance vehicle, such as a racecar or other vehicle capability of relatively high performance and speed. The vehicle 100 may be any one of a number of different types of automobiles and/or other vehicles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

In one embodiment depicted in FIG. 1, the vehicle 100 includes, in addition to the above-referenced downforce body 114 and control system 102, one or more downforce elements 101, a chassis 112, four wheels 116, an electronic control system (ECS) 118, a powertrain 129, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. As depicted in FIG. 1, each wheel 116 comprises a wheel assembly that includes a tire 117 as well as a wheel and related components (and that are collectively referred to as the "wheel 116" at times for the purposes of this Application). In various embodiments the vehicle 100 may differ from that depicted in FIG. 1.

In the exemplary embodiment illustrated in FIG. 1, the powertrain 129 includes an actuator assembly 120 that includes an engine 130. In various other embodiments, the powertrain 129 may vary from that depicted in FIG. 1 and/or described below (e.g. in some embodiments the powertrain may include a gas combustion engine 130, while in other embodiments the powertrain 129 may include an electric motor, alone or in combination with one or more other powertrain 129 components, for example for electric vehicles, hybrid vehicles, and the like). In one embodiment depicted in FIG. 1, the actuator assembly 120 and the powertrain 129 are mounted on the chassis 112 that drives the wheels 116. In one embodiment, the engine 130 comprises a combustion engine. In various other embodiments, the engine 130 may comprise an electric motor and/or one or more other transmission system components (e.g. for an electric vehicle), instead of or in addition to the combustion engine.

Still referring to FIG. 1, in one embodiment, the engine 130 is coupled to at least some of the wheels 116 through one or more drive shafts 134 (or axles). In the depicted embodiment, front axles 135 and rear axles 136 are depicted. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In various embodiments, the steering system 150 includes a steering wheel and a steering column, not depicted in FIG. 1.

The braking system 160 is mounted on the chassis 112, and provides braking for the vehicle 100. In various embodiments, the vehicle 100 automatically controls braking of the vehicle 100, at least in certain circumstances, via instructions provided from the control system 102 to the braking system 160.

With regard to the above-referenced downforce elements 101, in various embodiments the downforce elements 101 may comprise one or more wings, airfoils, spoilers, vents, and/or other devices that are configured to increase or decrease airflow based on control by the control system 102. In certain embodiments, the downforce elements 101 are mechanically operated and/or adjusted via the control system 102, for example by moving the downforce elements 101 into a different position, angle, or pitch, and/or by opening or closing a vent or other feature of the downforce elements 101. As depicted in FIG. 1, in various embodiments the downforce elements 101 may be formed from, within, against, or inside the body 114 of the vehicle 100 at any number of locations of the vehicle 100, for example in the front of the vehicle 100, in the back of the vehicle 100 (e.g. one or more front airfoils 151), in the rear of the vehicle 100 (e.g. one or more rear spoilers 152), on one or more sides of the vehicle 100 (e.g. one or more sets of wings 153), and/or within or underneath the body 114 (e.g. one or more vents 154 underneath the vehicle 100). It will be appreciated that the number, type, and/or location of the downforce elements 101 may vary in different embodiments. For example, in certain embodiments, the vehicle 100 may include a single downforce element 101. In other embodiments, the vehicle 100 may include multiple downforce elements 101, such as certain of the downforce elements 101 depicted in FIG. 1 and/or other downforce elements 101.

As noted above, the control system 102 mitigates turbulent air for the vehicle 100. In various embodiments, the control system 102 obtains measurements for various parameter values pertaining to the vehicle 100 during operation of the vehicle 100, determines whether turbulent air for the vehicle 100 is likely based on the parameter values, and provides an adjusted downforce for the vehicle via instructions provided to the downforce elements 101 when it is determined that vehicle turbulent air is likely for the vehicle 100, for example as discussed further below in greater detail in connection with the process 200 of FIGS. 2 and 3. In one embodiment, the control system 102 is mounted on the chassis 112.

As depicted in FIG. 1, in one embodiment the control system 102 comprises various sensors 104 (also referred to herein as a sensor array) and a controller 106. In certain embodiments, the sensors 104 comprise enhanced safety sensors for the vehicle 100. The sensors 104 include various sensors that provide measurements pertaining to possible turbulent air surrounding the vehicle 100, for use in mitigating the turbulent air for the vehicle 100. In the depicted embodiment, the sensors 104 include one or more radar sensors 164, cameras 165, thermal sensors 166, night vision sensors 168, and ultrasonic sensors 170.

The radar sensors 164 provide radar detections and measurements, for example with respect to the detection of other vehicles or other objects in proximity to the vehicle 100. In various embodiments, radar sensors 164 are disposed on or outside the body 114 of the vehicle 100, facing the environment surrounding the vehicle 100 (e.g. proximate the hood or roof, facing in front of the vehicle 100, and/or proximate the side and/or trunk, facing one or more directions from the vehicle 100). In various embodiments, data and measurements from the radar sensors 164 are provided to the controller 106 for processing, and for mitigating turbulent air for the vehicle 100.

The cameras 165 also detect, and provide images of, other vehicles or other objects in proximity to the vehicle 100. In various embodiments, various cameras 165 are disposed on or outside the body 114 of the vehicle 100, facing the environment surrounding the vehicle 100 (e.g. proximate the hood or roof, facing in front of the vehicle 100, and/or proximate the side and/or trunk, facing one or more directions from the vehicle 100). In certain embodiments, pairs of stereo cameras 165 are utilized. In various embodiments, data and images from the cameras 165 are provided to the controller 106 for processing, and for mitigating turbulent air for the vehicle 100.

The thermal sensors 166, night vision sensors 168, and ultrasonic sensors 170 are detect other vehicles or other objects in proximity to the vehicle 100. In various embodiments, such thermal sensors 166, night vision sensors 168, and/or ultrasonic sensors 170 are disposed on or outside the body 114 of the vehicle 100, facing the environment surrounding the vehicle 100 (e.g. proximate the hood or roof, facing in front of the vehicle 100, and/or proximate the side and/or trunk, facing one or more directions from the vehicle 100). In various embodiments, data and measurements from the thermal sensors 166, night vision sensors 168, and/or ultrasonic sensors 170 are provided to the controller 106 for processing, and for mitigating turbulent air for the vehicle 100.

It will be appreciated that in certain embodiments the sensor array 104 comprises a single type of sensor, from the list described above, and/or other type of enhanced safety sensor. It will also be appreciated that in various embodiments more than one such type of enhanced safety sensor, and/or all of the above-referenced types of enhanced safety sensors, and/or other types of enhanced safety sensors, may be utilized.

The controller 106 is coupled to the sensors 104 and to one or more other vehicle components (e.g. the downforce elements 101, the electronic control system (ECS) 118, the powertrain 129, e.g. the engine 130, the braking system 160, among other possible vehicle components) for mitigating turbulent air for the vehicle 100. In various embodiments, the controller 106 performs these and other functions in accordance with the processes described further below in connection with FIGS. 2 and 3.

As depicted in FIG. 1, the controller 106 comprises a computer system. In certain embodiments, the controller 106 may also include one or more of the sensors of the sensor array 104, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other systems, such as the braking system 160, the electronic control system (ECS) 118 of the vehicle 100, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs contained within the memory 174 and, as such, controls the general operation of the controller 106 and the computer system of the controller 106, generally in executing the processes described herein, such as those described further below in connection with FIG. 2.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184 (e.g. threshold values used for mitigating turbulent air in the vehicle 100).

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensors 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps described further below in connection with FIG. 2. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other systems.

It will be appreciated that the vehicle 100 can be operated in an automated manner by commands, instructions, and/or inputs that are "self-generated" onboard the vehicle itself. Alternatively or additionally, the vehicle 100 can be controlled by commands, instructions, and/or inputs that are generated by one or more components or systems external to the vehicle 100, including, without limitation: other vehicles; a backend server system; a control device or system located in the operating environment; or the like. In certain embodiments, therefore, the vehicle 100 can be controlled using vehicle-to-vehicle data communication, vehicle-to-infrastructure data communication, and/or infrastructure-to-vehicle communication, among other variations (including partial or complete control by the driver or other operator in certain modes, for example as discussed above).

Figure 2:
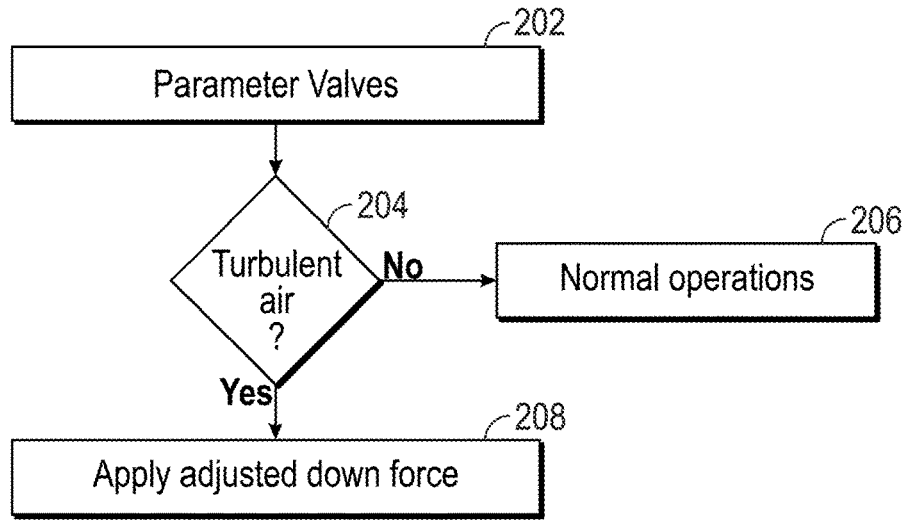
FIG. 2 is a flowchart of a process for mitigating turbulent air for a vehicle, and that can be used in connection with the system and vehicle of FIG. 1, in accordance with an exemplary embodiment.

With reference to FIG. 2, a flowchart is provided for a process 200 for mitigating turbulent air in a vehicle, in accordance with an exemplary embodiment. The process 200 may be implemented in connection with the vehicle 100 of FIG. 1, including the downforce elements 101 and the control system 102 thereof, in accordance with various embodiments.

As depicted in FIG. 2, the process 200 begins at step 202. In one embodiment, the process 200 begins when a vehicle is in operation, for example, when the vehicle is in a "drive mode", moving along a path or roadway, and/or ready for movement along a desired path.

During step 202, various data is obtained pertaining to parameters for the vehicle. In various embodiments, the data includes various information, measurements, and other data from the sensors 104 of FIG. 1 pertaining to parameters pertaining to the vehicle 100, the operation thereof, and/or the roadway or path on which the vehicle 100 is travelling, and particularly including one or more other vehicles and/or other objects that may be in proximity to the vehicle 100. In one embodiment, the data of step 204 includes data, images, and/or measurements from the radar sensors 164, cameras 165, thermal sensors 166, night vision sensors 168, ultrasonic sensors 170, and/or other enhanced safety sensors from the sensor array 104 pertaining to other vehicles in proximity to the vehicle 100. In one embodiment, the data pertains particularly to any moving vehicles that are or may be travelling at least substantially in front of the vehicle 100, and that may be causing a drafting situation and/or otherwise resulting in turbulent air for the vehicle 100. In addition, in certain embodiments, data is also obtained regarding one or more vehicle faults pertaining to vehicle dynamics, for example as determined via the steering system 150, the braking system 160, the ECS 118, the control system 102, and/or one or more other vehicle systems (e.g., as communicated via the vehicle bus 107 and/or the wireless system 108 from such other systems to the control system 102).

A determination is made as to whether turbulent air for the vehicle 100 is likely (step 204). In various embodiments, this determination is made via the processor 172 of FIG. 1 based on the parameter values of step 202. In one embodiment, such parameter values are utilized to determine whether an object or other vehicle is in proximity to the vehicle 100 in a manner that is likely to cause a disturbance in the air flow against or around the vehicle 100. Similar to the discussion above, in one embodiment, in one embodiment turbulent air is considered to be likely for the vehicle 100 if another moving vehicle is detected that is travelling substantially in front of the vehicle 100 in a manner that is likely to create a drafting situation for the vehicle 100, a disturbance of air flowing toward or around the vehicle 100, and/or that is likely to otherwise result in turbulent air for the vehicle 100. In one embodiment, turbulent air is determined to be likely if another moving vehicle is detected such that the other vehicle is travelling at least substantially in front of the vehicle 100 within a predetermined distance from the vehicle 100 (such that a distance between the vehicle 100 an the other vehicle is less than a predetermined distance threshold). In another embodiment, turbulent air is determined to be likely if another moving vehicle is detected such that the other vehicle is travelling in front of the vehicle 100 within a predetermined travel time from the vehicle 100 at the vehicles' current respective velocities (e.g. such that a time to collision between the vehicle 100 and the other vehicle is less than a predetermined time threshold). In certain embodiments, the distance threshold may not be completely pre-determined, and for example may be influenced by the size and shape of the vehicle (e.g. as supplied by one or more cameras, radar units, and/or other devices). It will be appreciated that in various embodiments, radar, Lidar, laser mesh mapping sensors, cameras, and/or one or more other devices may be utilized.

If it is determined in step 206 that turbulent air for the vehicle is not impending, then no changes are made, and the vehicle 100 continues operation as normal (step 206). In certain embodiments, downforce may continue to be applied as normal, but is not adjusted based on any impending turbulent air.

Conversely, if it is determined in step 204 that turbulent air for the vehicle is impending, then an adjusted downforce of the vehicle is provided (step 206). In various embodiments, the adjustment of the downforce is made by one or more of the downforce elements 101 of FIG. 1 via instructions provided by the processor 172 of FIG. 1 when a turbulent air is determined to be likely. In various embodiments, a relative downforce (front versus rear) is adjusted in step 208 to mitigate the turbulent air. For example, in one embodiment, the relative downforce (front versus rear) is adjusted to compensate for or correct a disturbance in the relative downforce (front versus rear) that was caused by the turbulent air. The adjusted downforce can be provided, for example, to improve cornering for the vehicle 100 and/or to enable the vehicle 100 to be sufficiently balanced so as to pass the other vehicle, for example on a racetrack. In addition, in certain embodiments, the adjusted downforce can be performed to affect the air that is flowing toward a third vehicle that is travelling behind the vehicle 100, for example to cause turbulent air to flow toward the third vehicle in a race scenario on a racetrack, so as to make it more difficult for the third vehicle to pass the vehicle 100 on the racetrack.

Figure 3:
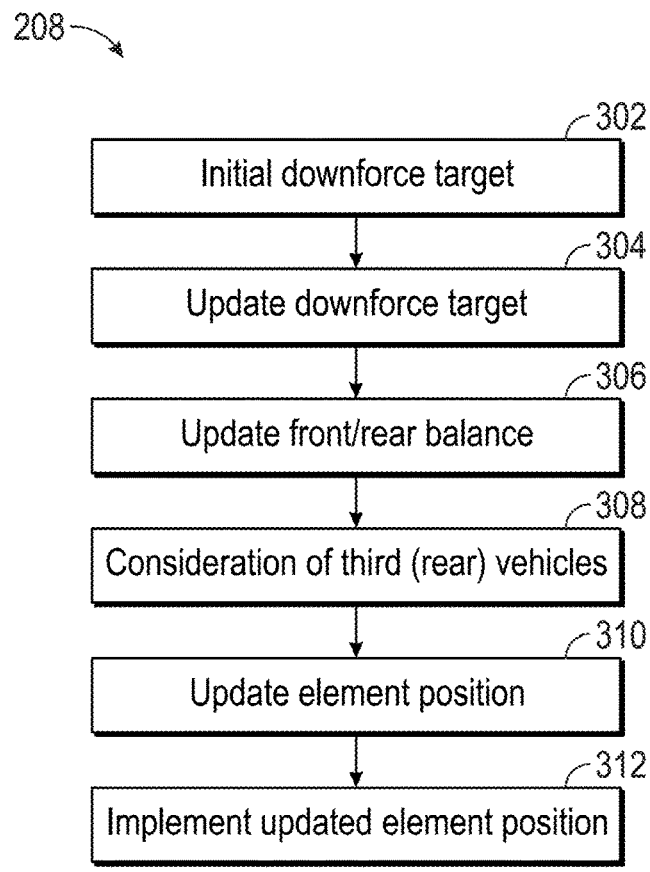
FIG. 3 is a flowchart of a sub-process for the process of FIG. 2, namely for providing an adjusted downforce for the vehicle, in accordance with an exemplary embodiment.

With reference to FIG. 3, a flowchart is provided with respect to various steps (or sub-steps) for step 208 (or sub-process 208) of FIG. 2 for providing an adjusted downforce for the vehicle, in accordance with an exemplary embodiment.

As depicted in FIG. 3, in one embodiment, initial downforce targets are obtained (step 302). In one embodiment, the initial downforce targets comprise a standard or default value of downforce for the vehicle. In various embodiments, different downforce targets are obtained for the front of the vehicle versus for the rear of the vehicle. Also in one embodiment, the initial downforce targets are stored in the memory 174 of FIG. 1 as stored values 184 thereof prior to the current ignition cycle or vehicle drive (e.g. during manufacturing, or during configuration for racing or other performance features, among other possible configurations). Also in one embodiment, the initial downforce targets comprise default values under average, normal, or typical conditions, and/or in the absence of other parameter data. Similar to the discussion above, in certain embodiments, separate initial downforce targets are obtained for the front versus rear axles 135, 136. In certain embodiments, the initial downforce targets in step 302 pertain to desired or targeted downforce targets based on current operating conditions for the vehicle 100 other than considerations of possible turbulent air. In certain embodiments, the initial downforce targets include separate initial maximum downforce target values for the front and rear axles 135, 136.

In addition, one or more updated downforce targets are determined (step 304). In one embodiment, during step 304, the downforce target is updated upward or downward from the initial target of step 302, based on the combination of the effects of the various parameter values of step 202, and based on whether a likelihood of turbulent air for the vehicle is determined in step 204. In one example in which the downforce targets of step 302 already incorporate other parameter values for operation of the vehicle 100, in step 304 these targets are adjusted with respect to the possibility of turbulent air surrounding the vehicle 100 and/or heading toward or around the vehicle 100. For example, in one embodiment, a determination is made as to an imbalance in downforce generated by the turbulent air, and the imbalance in downforce is corrected via the adjustment of step 304. For example, in one embodiment, if the turbulent air is approaching the vehicle 100 in a manner that results in an increase in relative front/rear downforce, then the adjustment in step 304 will provide a correspondence decrease (preferably substantially identical in magnitude) in relative front/rear downforce. Conversely, in one embodiment, if the turbulent air is approaching the vehicle 100 in a manner that results in a decrease in relative front/rear downforce, then the adjustment in step 304 will provide a correspondence increase (preferably substantially identical in magnitude) in relative front/rear downforce.

A front and rear balance of the vehicle is adjusted (step 306). In one embodiment, a balance between the front and rear of the vehicle 100 is adjusted by the processor 172 of FIG. 1 based on the updated downforce targets of step 304. Specifically, in one embodiment, the change in the downforce target is effectively distributed between the front and rear axles 135, 136 of the vehicle 100 in order to help mitigate any turbulent air. In certain embodiments, this is performed as part of step 304, described above. In one such embodiment, the prior targets pertain to downforce that was initially intended to be effectively distributed equally between the front and rear axles 135, 136, but the relative downforce targets are changed when turbulent air for the vehicle is determined in order to counterbalance the disruption of the relative downforce that was initially caused by the turbulent air (e.g. in the manner discussed above).

Also in certain embodiments, the relative downforce targets are also adjusted with consideration of one or more third vehicles that may be travelling behind the vehicle 100 (e.g. on a race track) (step 308). For example, also similar to the discussion above, in certain embodiments, the adjusted downforce targets adjust the downforce for the vehicle 100 in a manner that results in turbulent air flowing toward one or more third vehicles that are travelling behind the vehicle 100, for example to cause turbulent air to flow toward the third vehicle in a race scenario on a racetrack, so as to make it more difficult for the third vehicle to pass the vehicle 100 on the racetrack.

A desired position or adjustment of one or more downforce elements is determined (step 310). In various embodiments, the processor 172 of FIG. 1 determines a desired position or adjustment of one or more of the downforce elements 101 of FIG. 1 (for example, one or more front airfoils 151, rear spoilers 152, wings 153, and/or vents 154) in order to attain desired downforce adjustments for the vehicle 100 (e.g. for the front axle 135, the rear axle 136, or both) to attain the desired updated downforce target and front/rear balance of steps 304, 306, and 308. In various embodiments, the desired position or adjustment may pertain to a change in position, an end position, or both, of the respective downforce elements (101) (e.g. a change in angle, amount of opening, physical location, and so on), and/or a particular action (e.g. by an actuator, valve, or other device) that may be controlled by the processor 172 for obtaining this desired result.

The desired position or adjustment of the one or more downforce elements is then implemented (step 312). In various embodiments, the processor 172 of FIG. 1 causes a change in angle, movement, opening or closure, or other change in angle, position, or status of the respective downforce elements 101 in order to achieve the desired position or adjustment of step 310. In various embodiments, the controller 106 controls one or more actuators, vents, and/or other control mechanisms for adjustment of the respective downforce elements 101 in this manner (e.g. by adjusting an angle or position of one or more front airfoils 151, rear spoilers 152, and/or wings 153, and/or opening or closing one or more vents 154, among other potential actions in accordance with various embodiments).

Accordingly, methods, systems, and vehicles are provided that mitigate turbulent air, such as for racecars or other performance vehicles. In various embodiments, the vehicle turbulent air is mitigated by applying braking units of the vehicle, providing torque to a powertrain of the vehicle, and/or providing an adjusted downforce for the vehicle. Such methods, systems, and vehicles can be advantageous, for example, by keeping the vehicle in proximity to the ground of the roadway or path on which the vehicle is travelling.

It will be appreciated that the disclosed methods, systems, and vehicles may vary from those depicted in the Figures and described herein. For example, the vehicle 100, the downforce elements 101, the control system 102, and/or various components thereof may vary from that depicted in FIG. 1 and described in connection therewith. It will similarly be appreciated that the process 200 may differ from that depicted in FIGS. 2 and 3, and/or that one or more steps may occur simultaneously or in a different order than depicted in FIG. 2, among other possible variations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof

What is claimed is:

1. A method comprising:
    detecting, via a sensor of a first automobile travelling along a roadway, the first automobile having one or more downforce elements, a second automobile that is travelling along the roadway in front of the first automobile during operation of the first automobile;
    calculating, via a processor coupled to the sensor, a distance between the first automobile and the second automobile, during operation of the first automobile as the first and second automobiles are travelling along the roadway;
    determining whether turbulent air for the first automobile is likely based on the calculated distance as the first and second automobiles are travelling along the roadway; and
    adjusting movement of the one or more downforce elements of the first vehicle automobile as the first automobile is travelling along the roadway, provided that the second automobile is travelling substantially in front of the first automobile, and provided further that the distance between the first automobile and the second automobile is less than a predetermined distance threshold, based on the calculated distance between the first automobile and the second automobile as the first and second automobiles are travelling along the roadway, thereby adjusting a downforce for the first vehicle automobile as the first automobile is travelling along the roadway, thereby keeping the first automobile in proximity to the roadway, via a processor, using instructions provided via the processor for controlling the one or more downforce elements for the first automobile, when a determination is made that turbulent air for the first automobile is likely as the first and second automobiles are travelling along the roadway based on the calculated distance between the first automobile and the second automobile;
    wherein the step of adjusting the movement of the one or more downforce elements comprises:
    adjusting the movement of the one or more downforce elements for the first automobile as the first automobile is travelling along the roadway, via the processor, using instructions provided via the processor for controlling one or more downforce elements for the first automobile in a manner that adjusts airflow toward another automobile that is travelling behind the first automobile as the first automobile is travelling along the roadway.

2. The method of claim 1, wherein the first automobile has one or more aerodynamic wings, and the step of adjusting movement the one or more downforce elements comprises adjusting movement of one or more of the aerodynamic wings of the first automobile as the first automobile is travelling along the roadway when a determination is made that turbulent air for the first automobile is likely based on the calculated distance between the first automobile and the second automobile as the first and second automobiles are travelling along the roadway.

3. The method of claim 1, further comprising:
obtaining one or more parameter values pertaining to detection of the second automobile that is moving at least substantially in front of the first automobile as the first and second automobiles are travelling along the roadway;
wherein:
the step of determining whether turbulent air for the first automobile is likely comprises determining whether the turbulent air is likely based also on whether the second automobile is moving at least substantially in front of the first automobile as the first and second automobiles are travelling along the roadway; and
the step of adjusting movement of the one or more downforce elements comprises adjusting movement of the one or more downforce elements as the first automobile is travelling along the roadway based also on whether a determination is made that the second automobile is moving at least substantially in front of the first automobile as the first and second automobiles are travelling along the roadway.

4. The method of claim 1, wherein the step of adjusting the movement of the one or more downforce elements comprises:
adjusting the movement of the one or more downforce elements for the first automobile as the first automobile is travelling along the roadway, via the processor, using instructions provided via the processor for controlling one or more downforce elements for the first automobile in a manner that adjusts a relative front/rear downforce of the first automobile to counteract a disturbance in the relative front/rear downforce caused by the turbulent air as the first and second automobiles are travelling along the roadway, a determination is made that turbulent air for the first automobile is likely based on the calculated distance between the first automobile and the second automobile as the first and second automobiles are travelling along the roadway.

5. A system comprising:
one or more sensors of a first automobile having one or more downforce elements, the one or more sensors configured to detect a second automobile that is travelling along the roadway in front of the first automobile during operation of the first automobile; and
a processor coupled to the one or more sensors and configured to at least facilitate:
calculating a distance between the first automobile and the second automobile, during operation of the first automobile as the first and second automobiles are travelling along the roadway;
determining whether turbulent air for the first automobile is likely based on the calculated distance as the first and second automobiles are travelling along the roadway; and
adjusting movement of the one or more downforce elements of the first automobile as the first automobile is travelling along the roadway, provided that the second automobile is travelling substantially in front of the first automobile, and provided further that the distance between the first automobile and the second automobile is less than a predetermined distance threshold, based on the calculated distance between the first automobile and the second automobile as the first and second automobiles are travelling along the roadway, thereby adjusting a downforce for the first automobile as the first automobile is travelling along the roadway, thereby keeping the first automobile in proximity to the roadway, by providing instructions for controlling the one or more downforce elements for the first automobile for the first automobile, when a determination is made that turbulent air for the first automobile is likely as the first and second automobiles are travelling along the roadway based on the calculated distance between the first automobile and the second automobile;
wherein the processor is configured to at least facilitate:
adjusting the movement of the one or more downforce elements for the first automobile as the first automobile is travelling along the roadway, via instructions provided by the processor for controlling movement of the one or more downforce elements for the first automobile in a manner that adjusts airflow toward another automobile that is travelling behind the first automobile as the first automobile is travelling along the roadway.

6. The system of claim 5, wherein the first automobile has one or more aerodynamic wings, and the processor is configured to at least facilitate adjusting movement of one or more of the aerodynamic wings of the first automobile as the first automobile is travelling along the roadway when a determination is made that turbulent air for the first automobile is likely based on the calculated distance between the first automobile and the second automobile as the first and second automobiles are travelling along the roadway.

7. The system of claim 5, wherein:
the one or more sensors are further configured to obtain one or more parameter values pertaining to detection of the second automobile that is moving at least substantially in front of the first automobile as the first and second automobiles are travelling along the roadway; and
the processor is configured to at least facilitate:
determining whether the turbulent air is likely based also on whether the second automobile is moving at least substantially in front of the first automobile as the first and second automobiles are travelling along the roadway; and
adjusting movement of the one or more downforce elements as the first automobile is travelling along the roadway based also on whether a determination is made that the second automobile is moving at least substantially in front of the first automobile as the first and second automobiles are travelling along the roadway.

8. The system of claim 5, wherein the processor is configured to at least facilitate:
adjusting the movement of the one or more downforce elements for the first automobile as the first automobile is travelling along the roadway, via instructions provided by the processor for controlling movement of the one or more downforce elements for the first automobile in a manner that adjusts a relative front/rear downforce of the first automobile to counteract a disturbance in the relative front/rear downforce caused by the turbulent air, when a determination is made that turbulent air for the first automobile is likely based on the calculated distance between the first automobile and the second automobile as the first and second automobiles are travelling along the roadway.

9. An automobile comprising:
one or more downforce elements;
one or more sensors configured to detect a second that is travelling along a roadway in which the automobile is also travelling, in front of the automobile during operation of the automobile; and
a processor coupled to the one or more sensors and configured to at least facilitate:
 calculating a distance between the automobile and the second automobile, during operation of the automobile as the automobile and the second automobile are travelling along the roadway;
 determining whether turbulent air for the automobile is likely based on the calculated distance as the automobile and the second automobile are travelling along the roadway; and
 adjusting movement of the one or more downforce elements of the automobile as the automobile is travelling along the roadway, provided that the second automobile is travelling substantially in front of the automobile, and provided further that the distance between the automobile and the second automobile is less than a predetermined distance threshold, based on the calculated distance between the automobile and the second automobile as the automobile and the second automobile are travelling along the roadway, thereby adjusting a downforce for the automobile, during operation of the automobile as the automobile is travelling along the roadway, thereby keeping the automobile in proximity to the roadway, by providing instructions for controlling the one or more downforce elements when a determination is made that turbulent air for the automobile is likely as the automobile and the second automobile are travelling along the roadway based on the calculated distance between the automobile and the second automobile as the automobile and the second automobile are travelling along the roadway;
wherein the processor is configured to at least facilitate:
adjusting the movement of the one or more downforce elements for the automobile as the automobile is travelling along the roadway, via instructions provided by the processor for controlling movement of the one or more downforce elements for the automobile in a manner that adjusts airflow toward another automobile that is travelling behind the first automobile as the automobile is travelling along the roadway.

10. The automobile of claim 9, wherein:
the one or more downforce elements comprise one or more aerodynamic wings of the automobile; and
the processor is configured to at least facilitate adjusting movement of the one or more aerodynamic wings of the automobile as the automobile is travelling along the roadway when a determination is made that turbulent air for the automobile is likely based on the calculated distance between the automobile and the second automobile as the automobile and the second automobile are travelling along the roadway.

11. The automobile of claim 9, wherein:
the one or more sensors are further configured to obtain one or more parameter values pertaining to detection of the second automobile that is moving at least substantially in front of the automobile as the automobile and the second automobile are travelling along the roadway; and
the processor is configured to at least facilitate:
 determining whether the turbulent air is likely based also on whether the second automobile is moving at least substantially in front of the automobile as the automobile and the second automobile are travelling along the roadway; and
 adjusting movement of the one or more downforce elements as the automobile is travelling along the roadway based also on whether a determination is made that the second automobile is moving at least substantially in front of the automobile as the automobile and the second automobile are travelling along the roadway.

12. The automobile of claim 9, wherein the processor is configured to at least facilitate:
adjusting the movement of the one or more downforce elements for the automobile as the automobile is travelling along the roadway, via instructions provided by the processor for controlling movement of the one or more downforce elements for the automobile in a manner that adjusts a relative front/rear downforce of the automobile to counteract a disturbance in the relative front/rear downforce caused by the turbulent air, when a determination is made that turbulent air for the automobile is likely based on the calculated distance between the automobile and the second automobile as the automobile and the second automobile are travelling along the roadway.

* * * * *